United States Patent
Riedmann

(10) Patent No.: US 7,433,129 B2
(45) Date of Patent: Oct. 7, 2008

(54) OPTICAL ARRANGEMENT FOR MICROSCOPE AND MICROSCOPE

(75) Inventor: Juergen Riedmann, Harthausen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 63 days.

(21) Appl. No.: 11/288,829

(22) Filed: Nov. 29, 2005

(65) Prior Publication Data
US 2006/0119866 A1   Jun. 8, 2006

(30) Foreign Application Priority Data
Dec. 6, 2004   (DE) ....................... 10 2004 058 833

(51) Int. Cl.
*G02B 27/14* (2006.01)
*G02B 21/06* (2006.01)

(52) U.S. Cl. ....................... 359/629; 359/389

(58) Field of Classification Search ................ 359/629, 359/640, 368, 381, 618, 625, 636–639, 372, 359/389
See application file for complete search history.

(56) References Cited

U.S. PATENT DOCUMENTS

| 5,225,671 | A   | * | 7/1993  | Fukuyama ................ 250/216 |
| 6,624,403 | B2  | * | 9/2003  | Chen et al. ............... 250/201.2 |
| 2002/0154396 | A1 | * | 10/2002 | Overbeck .................. 359/368 |
| 2003/0137725 | A1 | * | 7/2003  | Mueller et al. .............. 359/386 |
| 2004/0095576 | A1 | * | 5/2004  | Wolleschensky ............ 356/317 |

* cited by examiner

*Primary Examiner*—Scott J Sugarman
*Assistant Examiner*—Dawayne A Pinkney
(74) *Attorney, Agent, or Firm*—Houston Eliseeva LLP

(57) ABSTRACT

An optical arrangement for a microscope, in particular for a scanning microscope, with a beam splitter 1 arranged in a divergent and/or convergent beam path for separating an illumination light 2 that is produced by an illumination source from a detection light 3 that is emitted by a sample being tested, which with regard to reliable correction of imaging errors can be implemented and developed even when using thick beam splitters 1 such that the beam splitter 1 is wedge-shaped and implemented as a beam splitter plate for reflection primarily at a glass-air interface 4. Furthermore, a microscope with such an optical arrangement is disclosed.

5 Claims, 1 Drawing Sheet

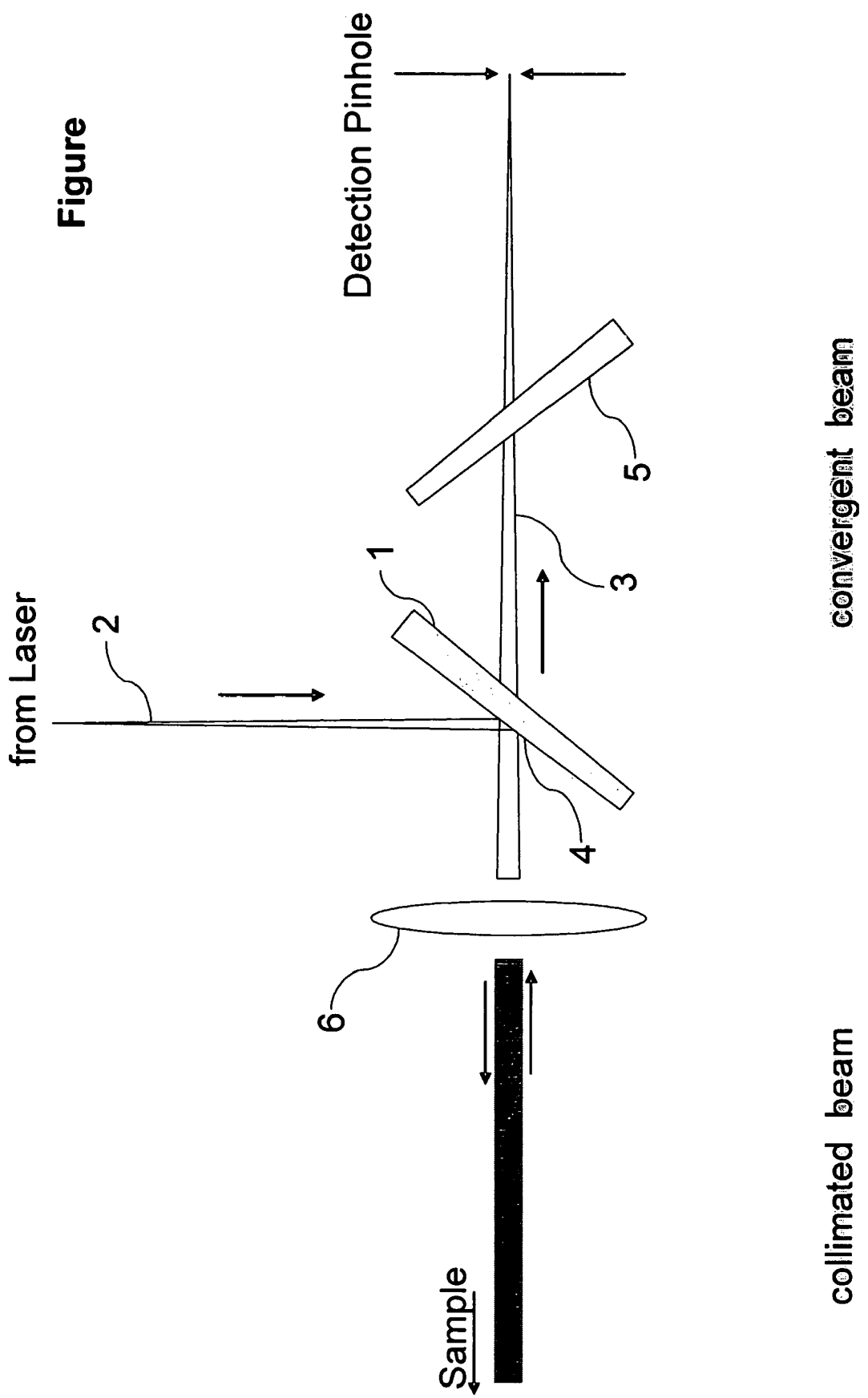

OPTICAL ARRANGEMENT FOR MICROSCOPE AND MICROSCOPE

RELATED APPLICATIONS

This application claims priority to German patent application number DE 10 2004 058 833.3, filed Dec. 6, 2004, which is incorporated herein by reference in its entirety.

FIELD OF INVENTION

The invention relates to an optical arrangement for a microscope, in particular for a scanning microscope, with a beam splitter arranged in a divergent and/or convergent beam path for separating an illumination light produced by an illumination source from a detection light emitted by a sample to he tested. The present invention further relates to a microscope, in particular to a scanning microscope, with such an optical arrangement.

BACKGROUND OF THE INVENTION

Optical arrangements of the aforementioned type are known from practice. For example, beam splitters are used in confocal laser scanning microscopes for separating the detection light that is present as fluorescent light, which carries the information about the sample, from the illumination light that is present as excitation light, with which dyes in the sample are excited. If one positions this beam splitter in the di-/convergent beam path, one has the advantage of a simple optical system and only minor disturbing influences caused by interferences that occur at the beam splitter. What is disadvantageous in comparison to the use of the beam splitter in the collimated beam are the imaging errors that occur in the di-/convergent beam. The imaging errors that are introduced when positioning the beam splitter in the di-/convergent beam are approximately proportional to the thickness of the beam splitter.

In a more recent development in the manufacturing engineering of beam splitters, significantly improved performance in these beam splitters with regard to transmission, reflection, and steepness of the edge has been achieved by the controlled application of considerably more—i.e., up to several hundred—individual coatings. However, these overall thicker layers also lead to higher stress in the coated material. This causes increased deformation in comparison to conventional coating techniques, something that one encounters with thicker substrates.

If such a new and improved beam splitter, with its necessary thickness of approximately 4 mm, is to be used in the di-/convergent beam of a confocal laser scanning microscope, the significant imaging errors introduced as a result of this greater thickness must be corrected for. Up to now this was not necessary with a suitable optical design of the overall system when using conventional beam splitters with a comparatively lesser thickness of for example, 0.75 mm. In conventional optical arrangements it is usual to use plane parallel beam splitters, and to combine these plane parallel beam splitters with other plane parallel glass elements if needed.

For example, a lateral chromatic aberration that has been introduced can be corrected by the use of a second plane parallel glass plate that is tipped 180° in relation to the beam splitter. However, in this case the astigmatism of the system is further increased by correction of the chromatic aberration.

In a further example of a conventional arrangement, the astigmatism that has been introduced is corrected by a further plane parallel glass plate that is rotated meridionally by 90° in relation to the beam splitter. Such correction of the astigmatism, however, further increases the chromatic aberration of the optical arrangement.

Furthermore, it is known when using beam splitters to prevent undesirable interference patterns when used in a collimated beam not to implement them as a plane parallel plate, but as a plate with a slight wedge angle. However, this is described exclusively for use of the beam splitter in a collimated beam. This measure is not needed when using the beam splitter in a di-/convergent beam because the interferences that occur produce a pattern solely through the divergence of light, which does not impair the functionality of the confocal laser scanning microscope. Chromatic aberrations are introduced when using this conventional measure as a result of the wedge angle—the prism effect—, which can be corrected for by using a further identical wedge lamina.

SUMMARY OF THE INVENTION

The object underlying the present invention is to disclose an optical arrangement constructed of simple materials for a microscope, and a scanning microscope of the aforementioned type that enables reliable correction of imaging errors when using thick beam splitters.

According to the invention, the aforementioned object is solved by an optical arrangement for a scanning microscope, comprising a beam splitter 1 that is arranged in the divergent and/or convergent beam path and that separates an illumination light beam 2 produced by an illumination source from a detection light that is emitted by a sample to be tested, whereby the beam splitter 1 is designed as wedge-shaped for reflection primarily at a glass-air interface.

In a manner according to the invention it has been realized that reliable correction of imaging errors is possible with an arrangement of the beam splitter in the di-/convergent beam that is constructed of simple materials. For this purpose, the beam splitter is concretely designed to be wedge-shaped and as a beam splitter plate. In such a beam splitter, reflection of a light beam occurs largely at a glass-to-air interface at the surface of the beam splitter. This enables correction of imaging errors—largely astigmatism and lateral chromatic aberrations—that have been introduced by thick beam splitter plates. Consequently, beam splitters that use the newer technology and exhibit thicknesses of approximately 4 mm may be used without having to take into consideration impairment in the performance of the optical arrangement as a result of imaging errors or interferences.

Consequently, an optical arrangement is disclosed in which reliable correction of imaging errors is enabled even when using thick beam splitters that are constructed of simple materials.

Further improved correction may be achieved by the arrangement of a glass plate in the beam path after the beam splitter. More precisely, the glass lamina is arranged behind the beam splitter in the detection beam path as seen from the sample.

Furthermore, with regard to particularly reliable correction of imaging errors, the glass lamina may be differently oriented and/or formed with reference to the beam splitter. The orientation and/or form of the glass lamina must be matched with the beam splitter that is used. The different orientation and/or form of the glass lamina signifies a considerable difference with regard to previously used glass lamina that are usually simply arranged so as to be mirrored or rotated in relation to the beam splitter. The arrangement and/or embodiment according to the invention deviates significantly herefrom.

In a further advantageous manner, the glass lamina may be designed to be wedge-shaped. This allows for particularly reliable correction of imaging errors in the di-/convergent beam.

It is important for the optical arrangement according to the invention that correction of lateral chromatic aberrations and astigmatism be achieved simultaneously. In other words, in the arrangement according to the invention, one should not have to consider whether correction of one error leads to worsening of the other error.

In a concrete embodiment, the glass lamina may exhibit a midpoint thickness of approximate 4.88 mm. Furthermore, a front surface of the glass lamina may be oriented at an angle of −51°27' to the optical axis of the arrangement. A back surface of the glass lamina could be oriented at an angle of −51°45' to the optical axis of the arrangement. Such concrete dimensioning and arrangement of the glass lamina can lead to reliable correction of imaging errors.

In a further concrete embodiment of the optical arrangement, the beam splitter may exhibit a midpoint thickness of approximately 4 mm. In this case, the beam splitter may exhibit a wedge angle of 21.6'. Such a beam splitter can, with regard to particularly reliable correction of imaging errors, be combined with a glass lamina that is arranged in the beam path and is dimensioned as aforedescribed.

To produce a convergent beam, a focusing lens with a focal length of approximately 80 mm may be arranged in the beam path in front of the beam splitter—as seen from the sample. Both the beam splitter and a facultatively provided glass lamina may be arranged in the focusing range of the focusing lens. The focusing lens could then produce a focus—as seen from the sample—from a collimated beam behind the entire beam splitter arrangement.

In a concrete development of the optical arrangement, the illumination source may be a laser.

The optical arrangement according to the invention or the microscope according to the invention enables simultaneous correction of lateral chromatic aberrations and astigmatism in a system that reacts insensitively to interferences that may occur. Both the beam splitter and the glass lamina may be manufactured out of BK7. The beam splitter may be arranged at an angle of 45° to the optical axis of the optical arrangement or of the microscope, respectively. With the optical arrangement according to the invention, it is possible to use the technologically newer beam splitters and bigger thicknesses in a confocal laser scanning microscope with a simplified optical construction, without having to consider impairment to the performance of the system that results from imaging errors or interferences.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. In the diagram, the sole FIGURE shows:

FIGURE—an embodiment of the optical arrangement for a microscope according to the invention in a schematic representation.

DETAILED DESCRIPTION OF THE PREFERRED EMBODIMENTS

There are a number of possibilities for developing the teaching of the present invention in an advantageous manner. For this purpose, reference is made to the subclaims and to the following explanation based on the diagram of a preferred embodiment of the teaching according to the invention. In connection with the explanation based on the diagram of the preferred embodiment of the teaching according to the invention, preferred embodiments and developments of the teaching in general will be explained as well FIG. 1 shows a schematic representation of an embodiment of an optical arrangement for a microscope according to the invention. The optical arrangement exhibits a beam splitter 1 arranged in the divergent and convergent beam path for separating an illumination light 2 that is produced by an illumination source from a detection light 3 that is emitted by the sample being tested. With regard to reliable correction of imaging errors, even when using thick beam splitters, the beam splitter 1 is wedge-shaped and implemented as a beam splitter plate. As a result, a reflection is made available largely at a glass-air interface 4.

The illumination light 2 is produced by a laser.

A glass lamina 5 is arranged in the beam path behind the beam splitter 1 for improved correction of imaging errors. The detection light 3 is focused on a detection pinhole by means of a focusing lens 6. The illumination light 2 is present as a divergent beam, and the detection light 3 as a convergent beam. The beam is collimated before the focusing lens 6.

Reliable correction of imaging errors—primarily astigmatism and lateral chromatic aberrations—is achieved with the optical arrangement according to the invention. The glass lamina 5 is implemented as wedge-shaped and oriented and formed differently with reference to the beam splitter 1.

With regard to further advantageous embodiments of the teaching according to the invention, in order to avoid repetition, reference is made to the general part of the description as well as to the attached patent claims.

Finally, it is expressly stated that the aforedescribed embodiment of the invention serves simply to explain the claimed teaching, but is not limited to this embodiment of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical arrangement for a scanning microscope with a beam splitter that is arranged in the divergent and/or convergent beam path and separates an illumination light that is produced by an illumination source from a detection light that is emitted by a sample being tested, wherein the beam splitter is implemented in a wedge shape for reflection primarily at a glass-air interface and wherein a focusing lens with a focal length of approximately 80 mm is arranged in the beam path—as seen from the sample—before the beam splitter.

2. The optical arrangement according to claim 1, wherein the beam splitter has a midpoint thickness of approximately 4 mm.

3. The optical arrangement according to claim 1, wherein the beam splitter has a wedge angle of 21.6'.

4. The optical arrangement according to claim 1, wherein the focusing lens produces a focus from a collimated beam behind the entire beam splitter arrangement—as seen from the sample.

5. The optical arrangement according to claim 1, wherein the illumination source is a laser.

* * * * *